United States Patent
Thubert et al.

(10) Patent No.: US 10,231,253 B2
(45) Date of Patent: Mar. 12, 2019

(54) PER-PACKET, TIME SLOTTED CHANNEL HOPPING (TSCH), META-TIMESLOT

(71) Applicant: Cisco Technology, Inc., San Jose, CA (US)

(72) Inventors: Pascal Thubert, La Colle sur Loup (FR); Simon Dyke, Hampshire (GB); Franck Bachet, Breval (FR); Guillaume Sauvage De Saint Marc, Sèvres (FR)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 15/341,099

(22) Filed: Nov. 2, 2016

(65) Prior Publication Data

US 2018/0124812 A1    May 3, 2018

(51) Int. Cl.
| | |
|---|---|
| *H04W 72/12* | (2009.01) |
| *H04B 1/69* | (2011.01) |
| *H04B 1/713* | (2011.01) |
| *H04W 40/00* | (2009.01) |
| *H04W 72/04* | (2009.01) |

(52) U.S. Cl.
CPC .......... *H04W 72/1263* (2013.01); *H04B 1/69* (2013.01); *H04B 1/713* (2013.01); *H04W 40/00* (2013.01); *H04B 2001/6908* (2013.01); *H04W 72/0446* (2013.01)

(58) Field of Classification Search
CPC ......... H04W 72/1263; H04W 72/0446; H04W 40/00; H04B 1/69; H04B 2001/6908; H04B 1/713
See application file for complete search history.

(56) References Cited

U.S. PATENT DOCUMENTS

| | | |
|---|---|---|
| 6,728,272 B1 | 4/2004 | Hosein |
| 9,319,332 B2 | 4/2016 | Thubert et al. |
| 2013/0083744 A1* | 4/2013 | Peng ............... H04W 52/04 |
| | | 370/329 |

(Continued)

OTHER PUBLICATIONS

Thubert et al., "An Architecture for Plv6 over the TSCH mode of IEEE 802.15.4e", Internet-Draft, <draft-thubert-6tisch-architecture-06>, Mar. 9, 2015.*

(Continued)

*Primary Examiner* — Ian N Moore
*Assistant Examiner* — Justin T Van Roie
(74) *Attorney, Agent, or Firm* — Behmke Innovation Group; James Behmke; Stephen Lebarron

(57) ABSTRACT

In one embodiment, a device in a network receives a time-slotted channel hopping (TSCH) communication schedule. The TSCH communication schedule is divided into a plurality of macrocells, each macrocell comprising a plurality of TSCH cells. The device receives a packet from a routing protocol child node of the device during a particular macrocell of the TSCH communication schedule that is associated with propagation of the packet through the network. In response to receiving the packet, the device claims a token associated with the particular macrocell that authorizes the device to transmit during one or more cells of the macrocell. The device transmits the received packet to a second node in the network during the authorized one or more cells of the particular macrocell.

18 Claims, 13 Drawing Sheets

(56) References Cited

U.S. PATENT DOCUMENTS

| | | |
|---|---|---|
| 2015/0372931 A1 | 12/2015 | Puleri et al. |
| 2016/0020967 A1 | 1/2016 | Thubert et al. |
| 2016/0020979 A1 | 1/2016 | Thubert et al. |
| 2016/0021011 A1 | 1/2016 | Vasseur et al. |
| 2018/0054380 A1* | 2/2018 | Jin .................... H04L 45/12 |

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

Watteyne, et al., "Using IEEE802.15.4e TSCH in an LLN context: Overview, Problem Statement and Goals draft-watteyne-6tsch-tsch-lln-context-02" Internet-Draft, Intended status: Informational; May 23, 2013, pp. 1-21.

Vasseur et al. "Routing Metrics Used for Path Calculation in Low-Power and Lossy Networks" Internet Engineering Task Force (IETF) Request for Comments: 6551, Category: Standards Track, ISSN: 2070-1721; pp. 1-30; Mar. 2012.

P. Thubert "Objective Function Zero for the Routing Protocol for Low-Power and Lossy Networks (RPL)" Internet Engineering Task Force (IETF), Request for Comments: 6552, Category: Standards Track, ISSN: 2070-1721; pp. 1-14; Mar. 2012.

O. Gnawali "The Minimum Rank with Hysteresis Objective Function" Internet Engineering Task Force (IETF) Request for Comments: 6719, Category: Standards Track, ISSN: 2070-1721; pp. 1-13; Sep. 2012.

T. Watteyne "Using IEEE 802.15.4e Time-Slotted Channel Hopping (TSCH) in the Internet of Things (IoT): Problem Statement" Internet Engineering Task Force (IETF), Request for Comments: 7554, Category: Informational, ISSN: 2070-1721; pp. 1-23; May 2015.

Thubert, et al., "An Architecture for IPv6 over the TSCH mode of IEEE 802.15.4e", Internet-Draft, <draft-thubert-6tisch-architecture-01>, Oct. 21, 2013, 20 pages, Internet Engineering Task Force Trust.

Palattella, et al., "Terminology in IPv6 over the TSCH mode of IEEE 802.15.4e", Internet-Draft, <draft-ietf-6tisch-terminology-00>, Nov. 18, 2013, 11 pages, Internet Engineering Task Force Trust.

Vilajosana, et al., "Minimal 6TiSCH Configuration", Internet-Draft, <draft-ietf-6tisch-minimal-00>, Nov. 19, 2013, 18 pages, Internet Engineering Task Force Trust.

* cited by examiner $T = T_0 + 1$

| A→PARENT1 (LOST, NO ACK) 1000b | 1000c | 1000d | 1000e | 1000f | 1000g |

FIG. 11A $T = T_0 + 2$

| 1000b | A→PARENT1 (RETRY) 1000c | 1000d | 1000e | 1000f | 1000g |

FIG. 11B $T = T_0 + 3$

| 1000b | 1000c | PARENT1→ PARENT2 1000d | 1000e | 1000f | 1000g |

FIG. 11C

| 1000b | 1000c | 1000d | PARENT2→ROOT 1000e | 1000f | 1000g |

| 1000b | 1000c | 1000d | 1000e | ROOT→NODE X 1000F | 1000g |

PER-PACKET, TIME SLOTTED CHANNEL HOPPING (TSCH), META-TIMESLOT

TECHNICAL FIELD

The present disclosure relates generally to computer networks, and, more particularly, to per-packet, time slotted channel hopping (TSCH), meta-timeslots.

BACKGROUND

In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

Low power and lossy networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. Changing environmental conditions may also affect device communications in an LLN. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 11A-11E illustrate an example of network devices using a macrocell to forward a packet in a network.

DESCRIPTION OF EXAMPLE EMBODIMENTS

Overview

Figure 1:
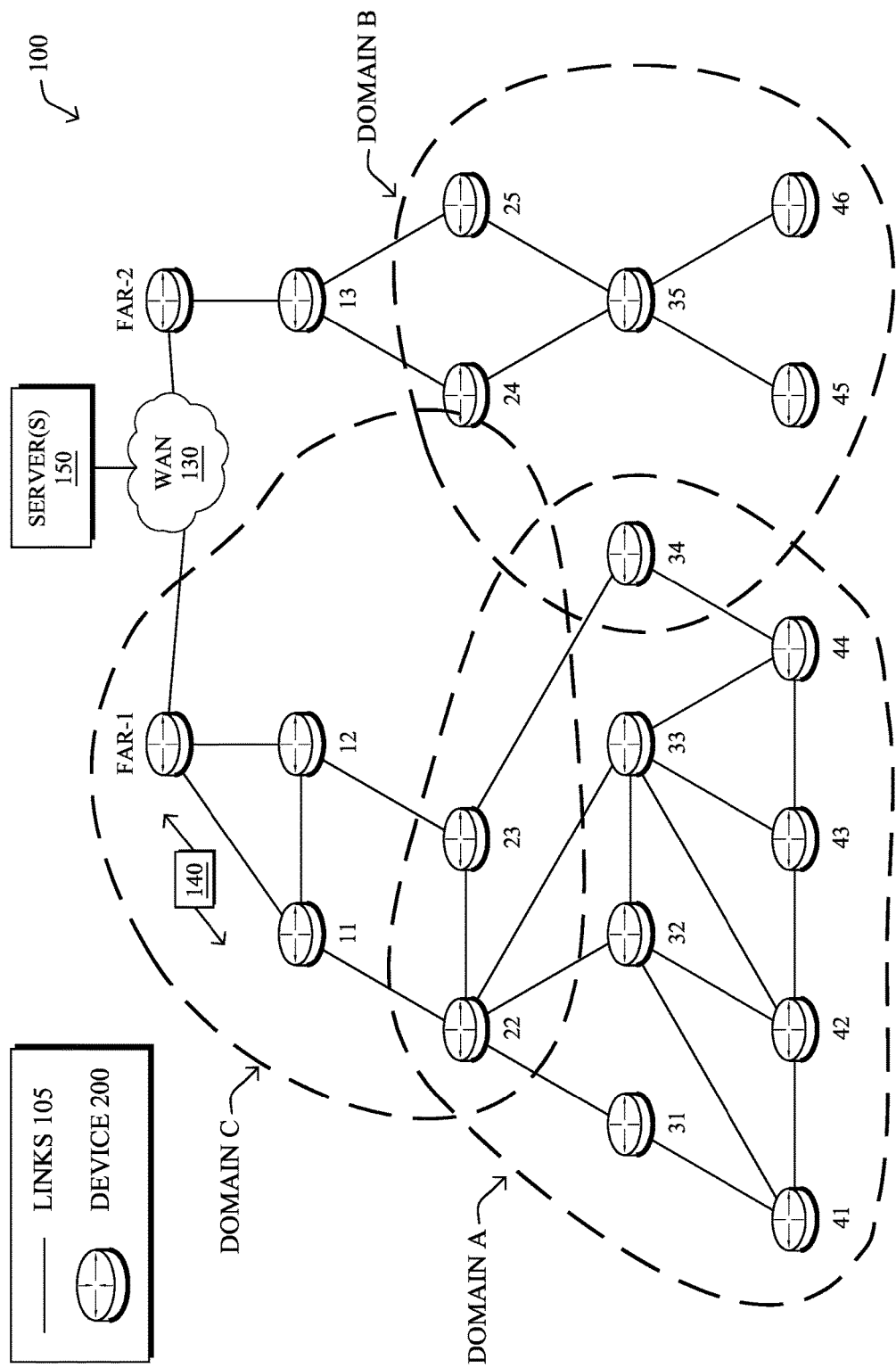
FIG. 1 illustrates an example communication network.

According to one or more embodiments of the disclosure, a device in a network receives a time-slotted channel hopping (TSCH) communication schedule. The TSCH communication schedule is divided into a plurality of macrocells, each macrocell comprising a plurality of TSCH cells. The device receives a packet from a routing protocol child node of the device during a particular macrocell of the TSCH communication schedule that is associated with propagation of the packet through the network. In response to receiving the packet, the device claims a token associated with the particular macrocell that authorizes the device to transmit during one or more cells of the macrocell. The device transmits the received packet to a second node in the network during the authorized one or more cells of the particular macrocell.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "FAR-1," "FAR-2," and "11," "12," . . . "46," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while network 100 is shown in a certain orientation, particularly with a field area router (FAR) node, the network 100 is merely an example illustration that is not meant to limit the disclosure. Also as shown, a particular FAR (e.g., FAR-1) may communicate via a WAN 130 with any number of servers 150, such as a path computation element (PCE), network management service (NMS), or other supervisory device.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. One communication technique that may be used to implement links 105 is channel-hopping. Also known as frequency hopping, use of such a technique generally entails wireless devices "hopping" (e.g., alternating) between different transmission and reception frequencies according to a known schedule. Network 100 may also be divided into any number of wireless domains (e.g., domains A-C) in which nodes 200 may communicate.

In some embodiments, network 100 may be configured as a deterministic network. Generally, deterministic networking refers to networks that can guaranty the delivery of packets within a bounded time. For example, industrial networking typically requires predictable communications between devices (e.g., to actuate a machine along an assembly line at a precise time, etc.). This translates into the following criteria: 1.) a high delivery ratio (e.g., a loss rate of 10-5 to 10-9, depending on the application), 2.) fixed latency, and 3.) jitter close to zero (e.g., on the order of microseconds).

A limited degree of control over the timing of network traffic can be achieved by using quality of service (QoS) tagging and/or performing traffic shaping/admission control. For time sensitive flows, though, latency and jitter can only be fully controlled by scheduling every transmission at every hop. In turn, the delivery ratio can be optimized by applying packet redundancy with all possible forms of diversity in terms of space, time, frequency, code (e.g., in CDMA), hardware (e.g., links, routers, etc.), software (implementations), etc. Most of the methods above apply to both Ethernet and wireless technologies. Mixed approaches may combine QoS technologies with scheduling (e.g., triggering emission of packets on the different QoS queues using a schedule-based gate mechanism).

Figure 2:
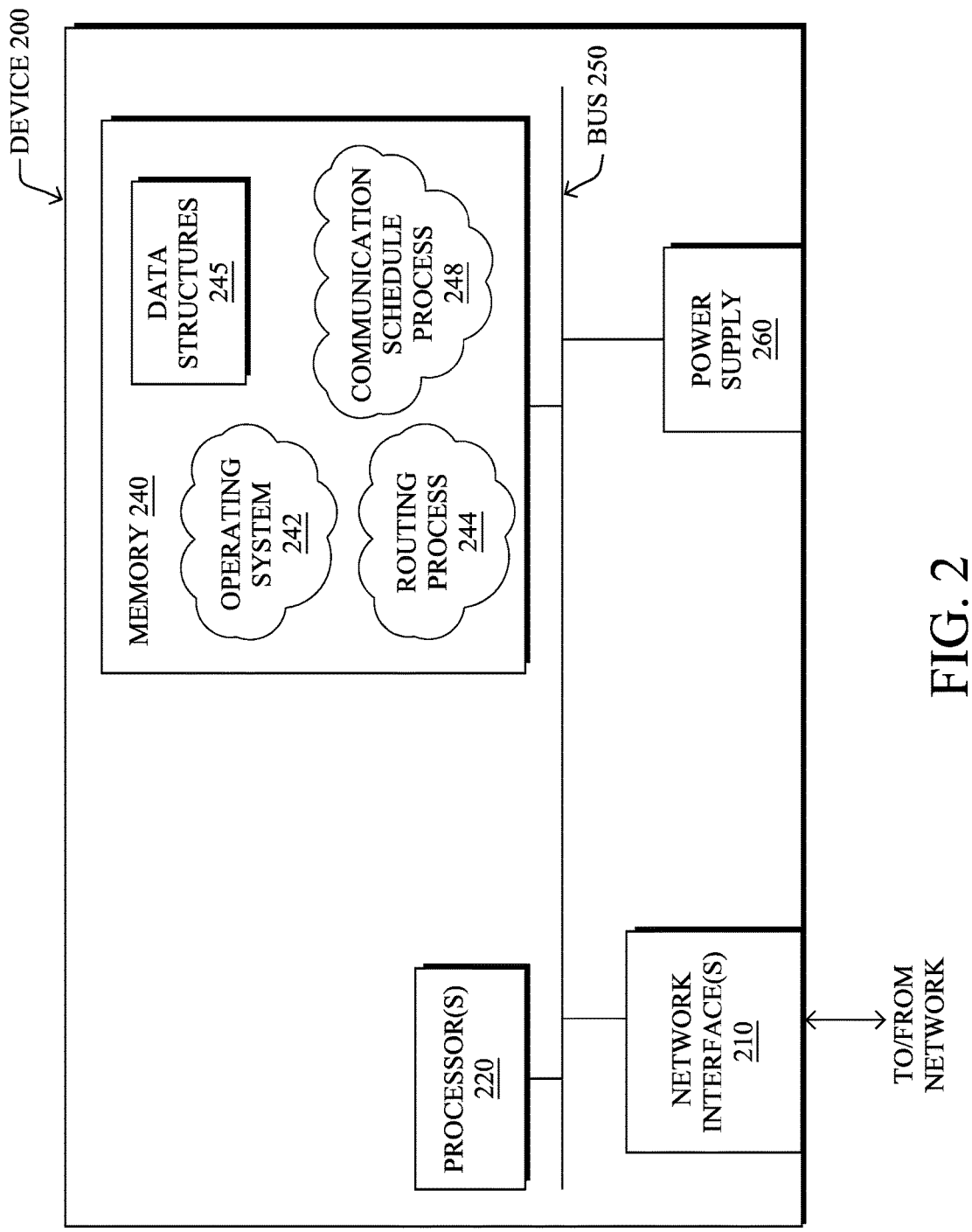
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, include the mechanical, electrical, and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic configured to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may include routing process/services 244, and an illustrative communication schedule process 248 as described in greater detail below. Note that while processes 244,248 are shown in centralized memory 240, alternative embodiments provide for either or both of processes 244,248 to be operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Deterministic networking is a fundamental component of the IoT, and is needed for time critical applications such as industrial automation, inflight control systems, internal vehicle networking, and the like. Most of these application fields are mission critical and require novel solution since up to recently they are manual controlled an operated, the emergence of dynamic system requiring the specification of the number of new solutions to address fast emerging requirements. Accordingly, in some embodiments, routing process 244 may be configured to support deterministic technologies such as Deterministic Ethernet or Deterministic Wireless. Generally, these technologies use time scheduling, to ensure that all nodes of a given path are synchronized. The Network Time Protocol (NTP) and Precision Time Protocol (PTP) are example protocols that may be used to synchronize the local timing mechanisms of the nodes. Forwarding of each packet is then regulated by the synchronized time schedule, which specifies when a given packet has to be transmitted. Generally, this time period is referred to as a time slot. In some implementations, an external agent (e.g., a PCE, etc.), sometimes referred to as a orchestrator, may be configured to compute the path and associated timetables for the path. The computed path and timetable are then downloaded onto every node along the path which, in turn, transmits packets along the path according to the computed time schedule.

An example routing protocol that may be used by routing process 244 for LLNs is specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012). Further, an example OF (e.g., a default OF) may be found in an IETF RFC, entitled "RPL Objective Function 0"<RFC 6552> by Thubert (March 2012) and "The Minimum Rank Objective Function with Hysteresis"<RFC 6719> by O. Gnawali et al. (September 2012).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
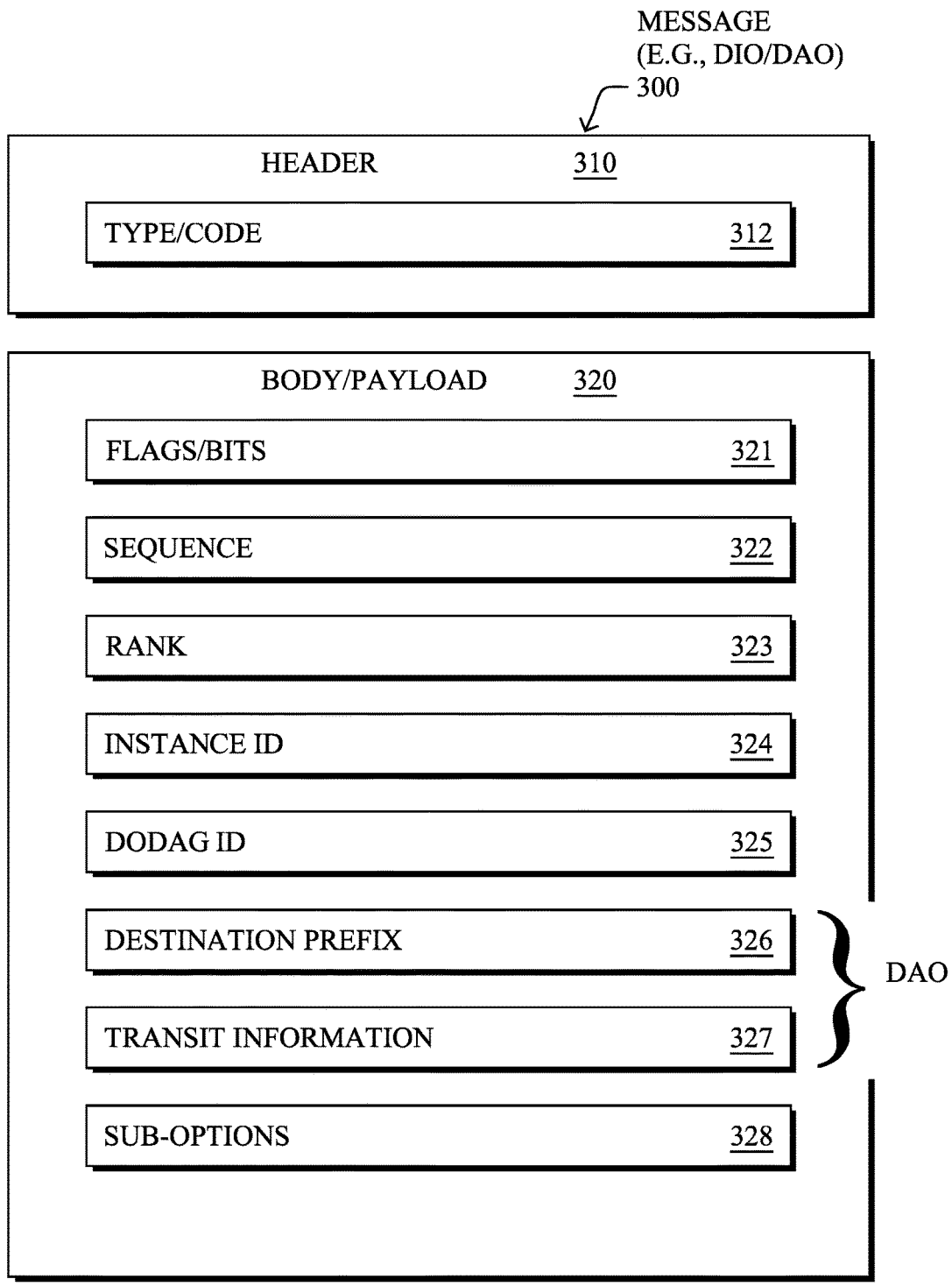
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
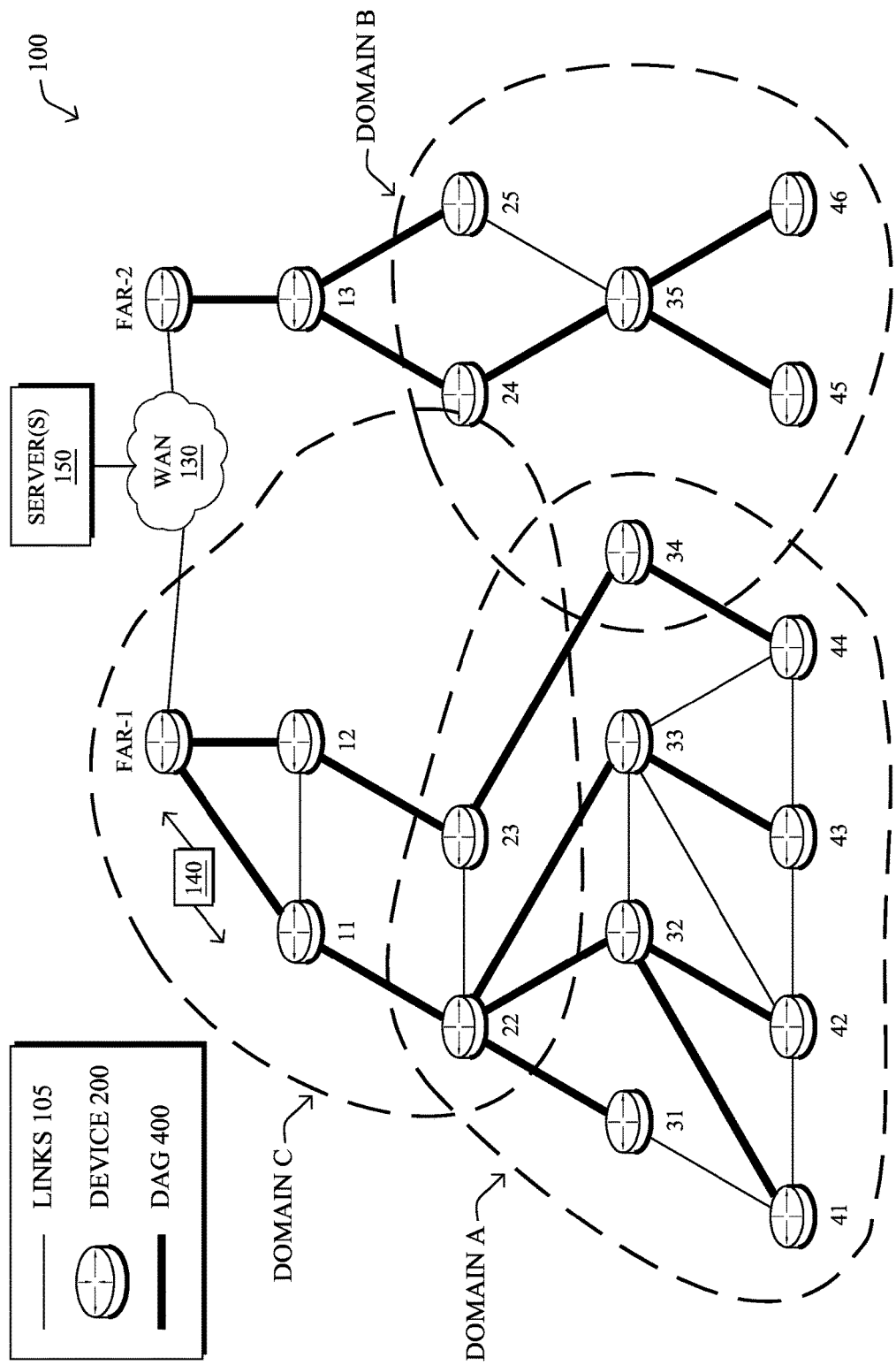
FIG. 4 illustrates an example directed acyclic graph (DAG) in the communication network of FIG. 1.

FIG. 4 illustrates an example simplified DAG 400 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 400 (shown as bolded lines), which extends from the root node toward one or more leaf nodes (nodes without children). Traffic/packets 140 (shown in FIG. 1) may then traverse the DAG 400 in either the upward direction toward the root or downward toward the leaf nodes, particularly as described herein.

According to various embodiments, communications within network 100 may be deterministic. Notably, low power wireless industrial process control typically uses 1 Hz to 4 Hz control loops, and for those, a scheduled MAC protocol can be considered deterministic, even when clocks drift in the order of tens of parts per million (ppm). A low-throughput technology such as IEEE802.15.4 may thus be adapted to support determinism. In particular, the bandwidth can be pre-formatted in a time division multiplexing (TDM) fashion using IEEE802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH." The centralized computation is typically done by a PCE with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol (RFC6550). The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery).

Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

For the underlying MAC operation, 6TiSCH relies, as its name shows, on time slotted channel hopping (TSCH). More specifically, 6TiSCH is being designed for the IEEE802.15.4e TSCH mode of operation. This is the standardized version of the MAC that was adopted by all industrial WSN standards, ISA100.11a, WirelessHART and WIAPA.

The time slotted aspect of the TSCH technology is a time division multiplexing (TDM) technique, which requires all nodes in the network to be time synchronized. In other words, time is sliced up into time slots with a given time slot being long enough for a MAC frame of maximum size to be sent from mote B to node A, and for node A to reply with an acknowledgment (ACK) frame indicating successful reception.

TSCH is different from traditional low-power MAC protocols because of its scheduled nature. In TSCH, all nodes in the network follow a common communication schedule, which indicates for each active (e.g., transmit or receive) timeslot a channel offset and the address of the neighbor to communicate with. The channel offset is translated into a frequency using a specific translation function which causes pairs of neighbors to "hop" between the different available channels (e.g., frequencies) when communicating. Such channel hopping technique efficiently combats multi-path fading and external interference. Notably, since 6TiSCH is based on TSCH, 6TiSCH also uses the basic TSCH concepts of a schedule and time slots. However, since 6TiSCH may extend over several interference domains with distributed routing and scheduling, there is no longer the concept of a single schedule that would centralize all the transmissions and receptions. In particular, with 6TiSCH, some TSCH concepts may still apply globally and their configurations must be shared by all nodes in the network, but other concepts may be local to a given node in 6TiSCH. For example, the hopping schedule in 6TiSCH may represent only the transmission to which a particular node is participating.

Figure 5:
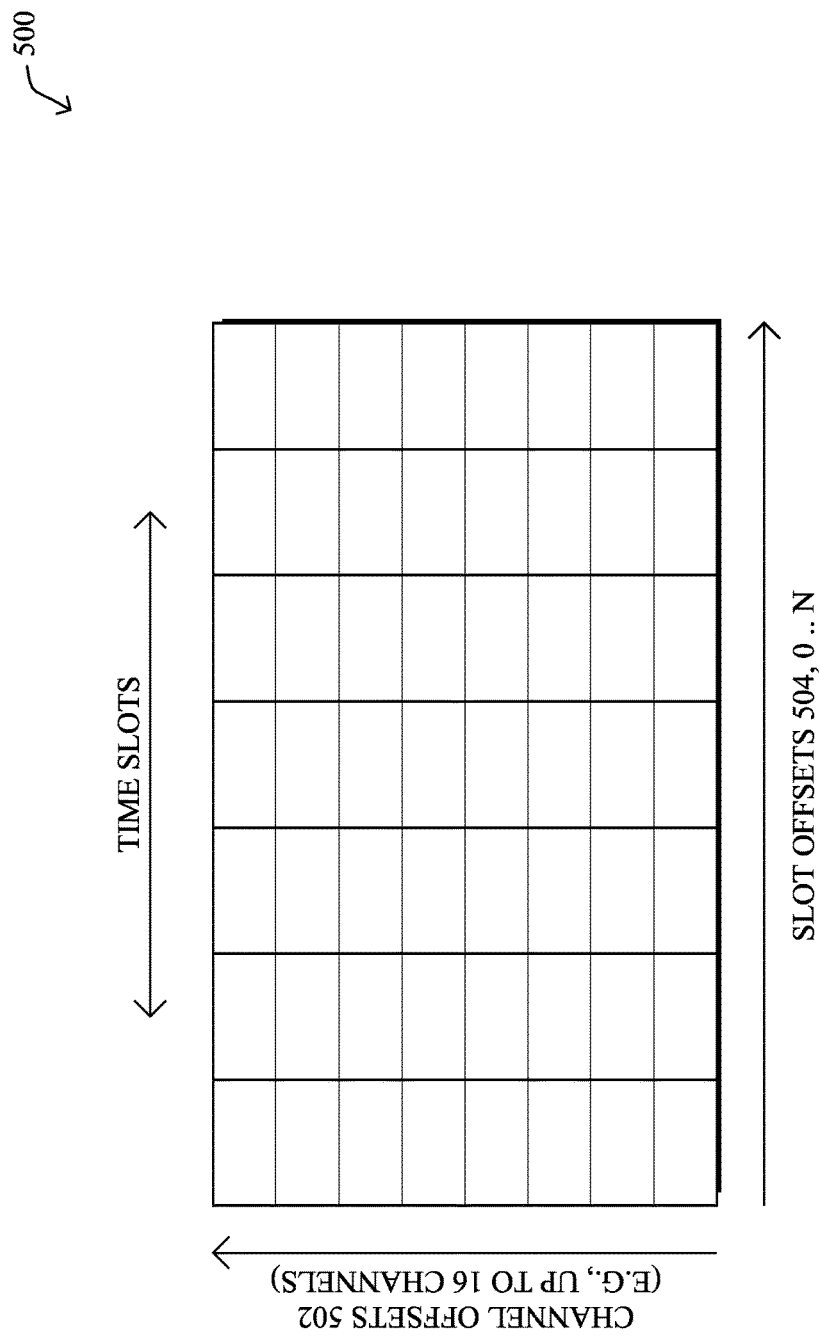
FIG. 5 illustrates an example channel distribution/usage (CDU) matrix.

Referring now to FIG. 5, an example channel distribution/usage (CDU) matrix 500 is shown that may be used by the nodes/devices 200 in network 100. Notably, 6TiSCH defines a new global concept of a CDU matrix that may repeat itself over time and represents the global characteristics of the network such as used/unused channels, timeslot durations, number of time slots per iteration, etc. As shown, CDU matrix 500 may include an index of channel offsets 502 along a first axis that correspond to the channels available for use in network 100 (e.g., offsets for each of sixteen available channels). As would be appreciated, any number of channels may be used in the network. Along the other axis are slot offsets 504 that correspond to differing time slots, the combination of which is equal to one period of the network scheduling operation.

CDU matrix 500 may be used to define the basic wireless communication operations for the network. For example, CDU matrix 500 may be used to define the duration of a timeslot (e.g., between 10 to 15 ms), the period of an iteration (e.g., the total number of time slots, indexed by slot offsets 504), and the number of channels (e.g., indexed by channel offset 502) to which the MAC may jump.

A "cell" in CDU matrix 500 is defined by the pair (slot offset, channel offset) in the epochal description of CDU matrix 500, in other words, at time t=0. During runtime, the actual channel at which a given transmission happens may be rotated to avoid interferences such as self-inflicted multipath fading.

Figure 6:
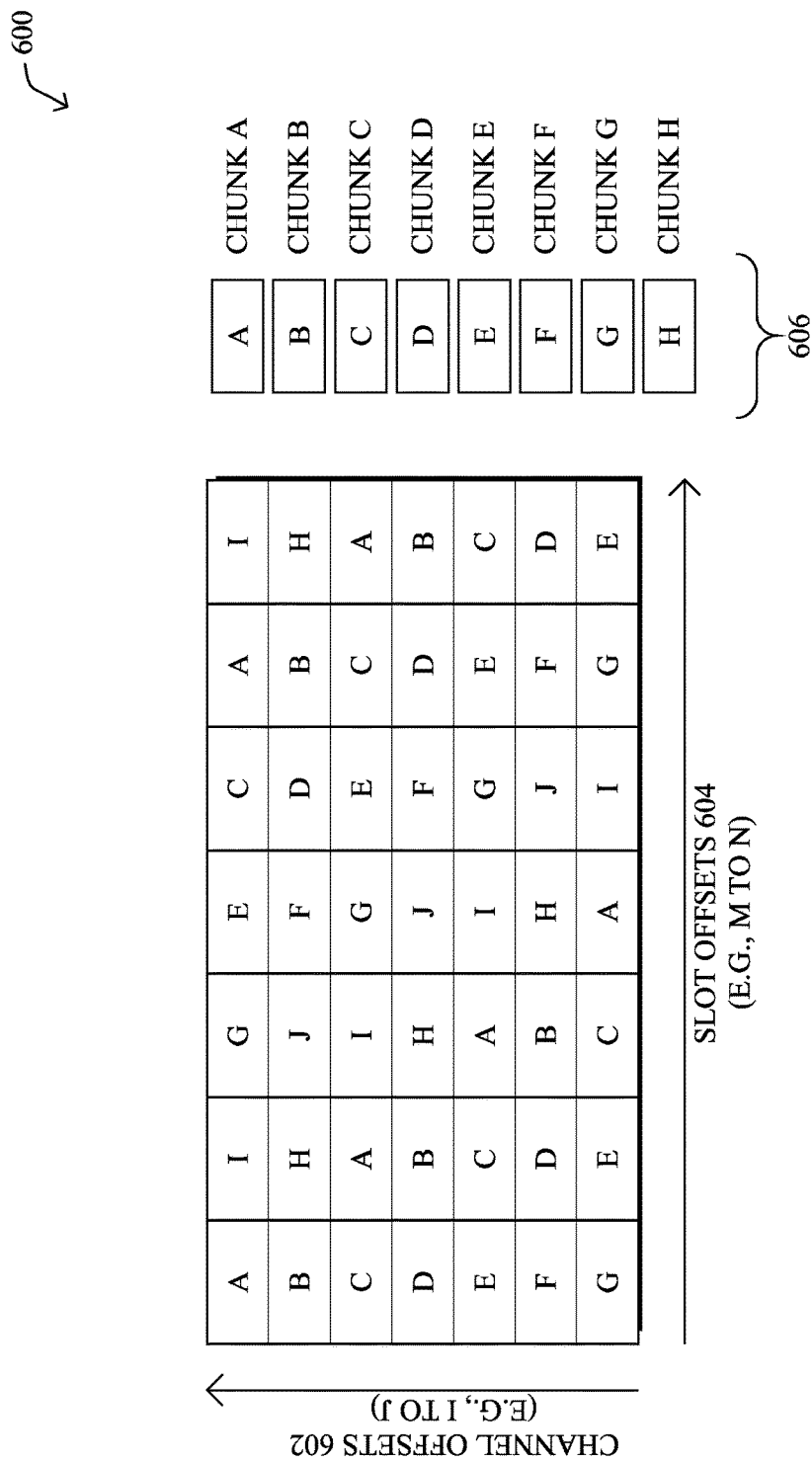
FIG. 6 illustrates example chunks of the CDU matrix of FIG. 5.

Referring now to FIG. 6, an example subset 600 of CDU matrix 500 is shown to be divided into chunks 606. In order to scale the network, the computation of the channel hopping schedule for the network may be distributed. According to some embodiments, such as those in which 6TiSCH is used, a parent node (e.g., an RPL parent) may be responsible for computing the schedule between the parent and its child node(s) in both directions. In order to allocate a cell for a given transmission, the parent node must be certain that this cell will not be used by another parent in the interference domain. As shown, for example, cells within CDU matrix 500 may be "owned" by different parent nodes within the network. The collective cells of CDU matrix 500 assigned to different parent nodes may then be grouped together as chunks 606. In one implementation, for example, CDU matrix 500 may be formatted into chunks by making a full partition of matrix 500. The resulting partition must be well known by all the nodes in the network, to support the appropriation process, which would rely on a negotiation between nodes within an interference domain.

Typically, there will be at most one cell in a chunk per column of CDU matrix 500, to reflect that a device with a single radio may not use two channels at the same time. The cells may also be well distributed in time and frequency, so as to limit the gaps between transmissions and avoid the sequential loss of frames in multipath fading due to the consecutive reuse of a same channel.

Chunks 606 may be defined at the epochal time (e.g., at the time of creation of CDU matrix 500) and the 802.15.4e operation may be repeated iteratively any number of times. Typically, the effective channel for a given transmission may be incremented by a constant that is prime with the number of channels, modulo the number of channels at each iteration. As a result, the channel of a given transmission changes at each iteration and the matrix virtually rotates.

Figure 7:
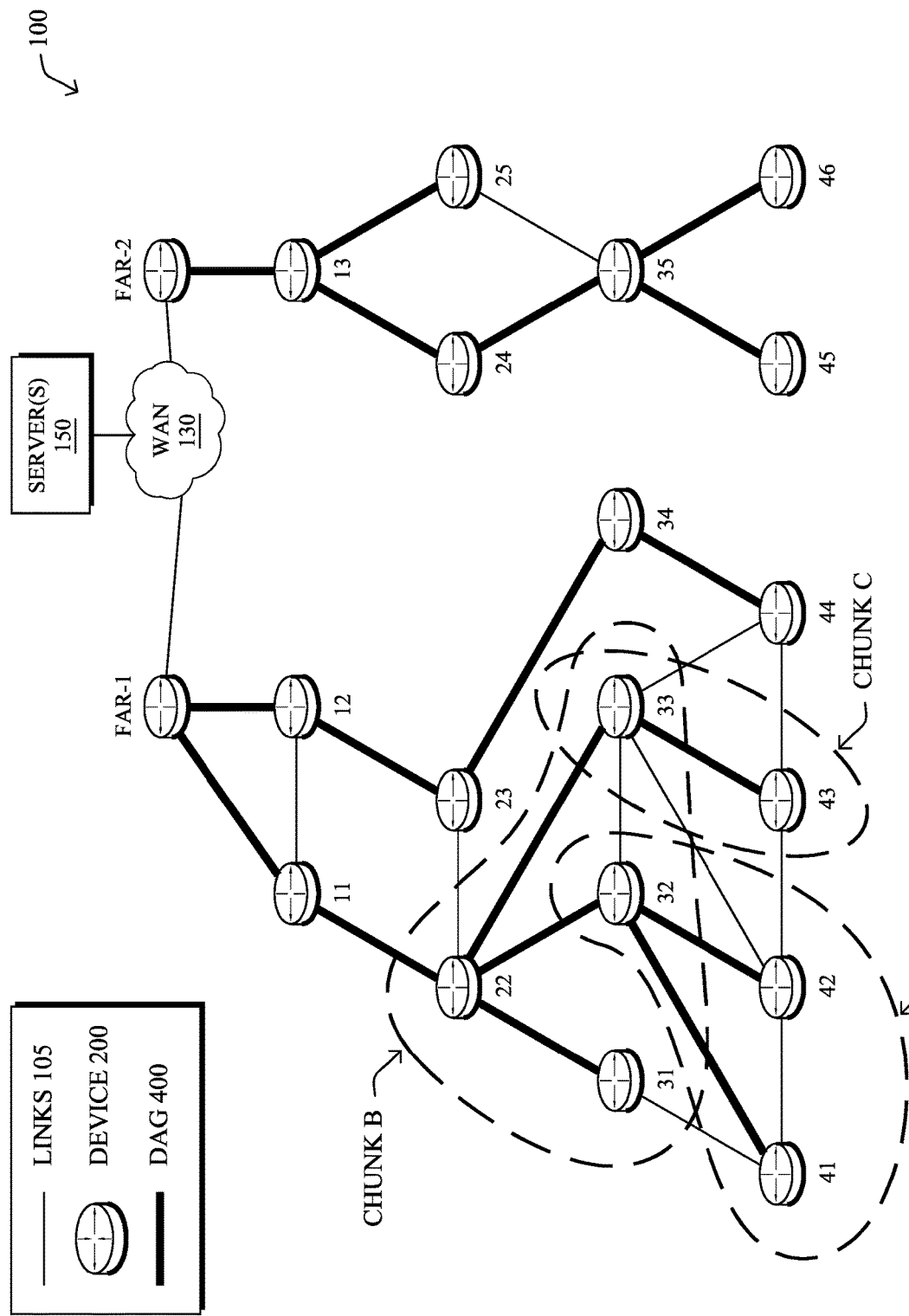
FIGS. 7-8 illustrate examples of a parent node in the network of FIG. 1 scheduling communications for a particular chunk.
Figure 8:
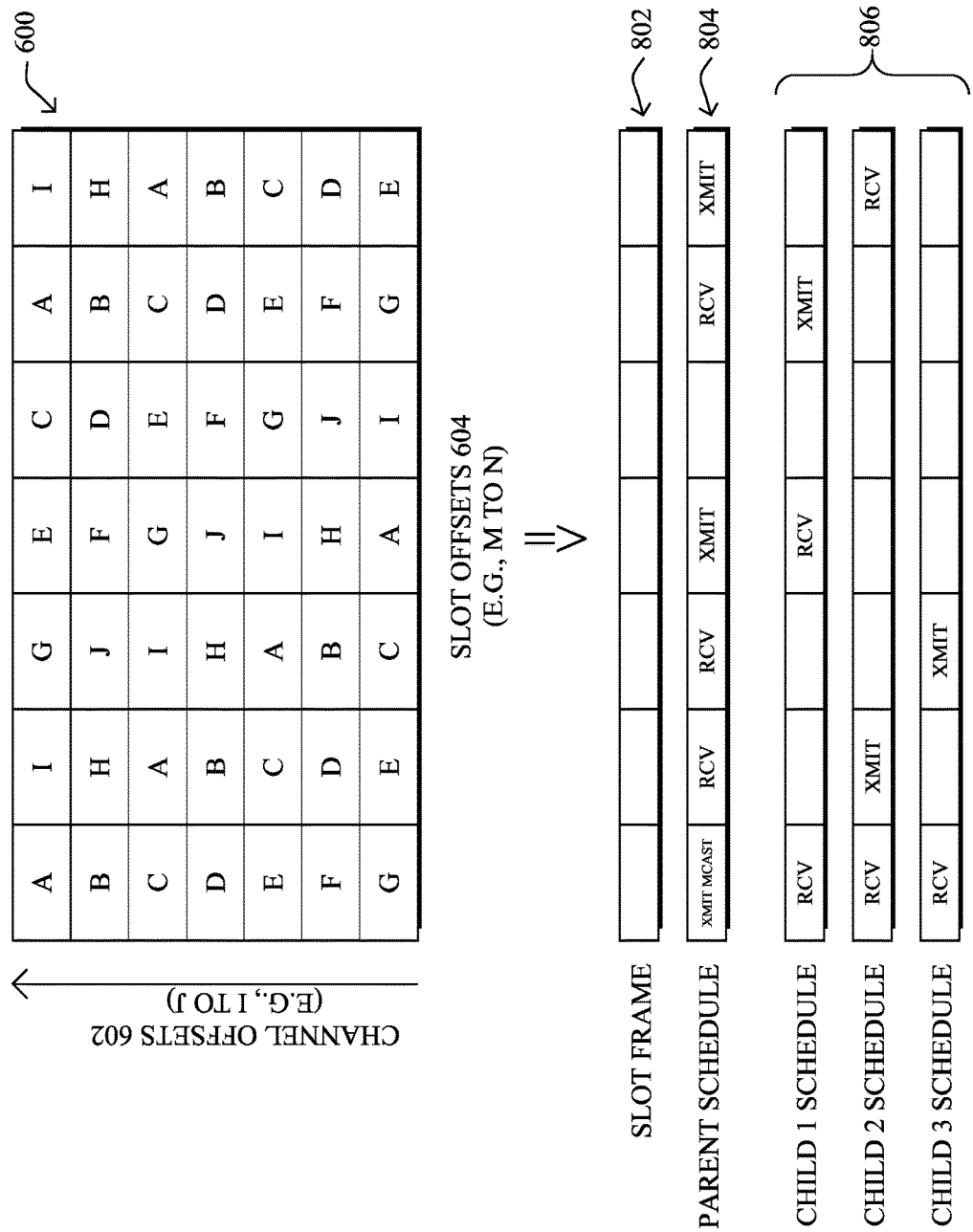

FIGS. 7-8 illustrate examples of a parent node in the network of FIG. 1 scheduling communications for a particular chunk. As shown, assume that node 32 is the parent node of child nodes 41, 42 according to the routing protocol. Node 32 may be assigned a chunk (e.g., chunk A) of CDU matrix 500, thereby allowing node 32 to manage the usage of the corresponding cells in the chunk within its interference domain. Thus, node 32 may decide which transmissions will occur over the cells in the chunk between itself and its child node(s). Ultimately, a chunk represents some amount of bandwidth and can be seen as the generalization in the time/frequency domain of the classical channel that is used to paint a wireless connectivity graph, e.g. to distribute TV frequencies over a country or WiFi channels in an ESS deployment.

If chunks are designed to form a partition of the CDU matrix 500, multiple different chunks may be in use in the same area of network 100 and under the control of different parents. In one embodiment, the appropriation process may be such that any given node that communicates using cells in a given chunk, as appropriated and managed by a parent A, should not be within the interference domain of any other node that is also communicating using the same chunk but appropriated and managed by a different parent B. Consequently, the number of parents in any given area of the network may be constrained by the number of chunks.

Referring more specifically to FIG. 8, parent node 32 may use a slot frame 802 to assign hopping schedules 804, 806 to itself and any of its child node(s), respectively. Generally speaking, slot frame 802 is a MAC-level abstraction that is also internal to the node and includes a series of time slots of equal length and priority. For example, the size of the slot frame 802 may match the CDU matrix 500. Parent node 32 may use slot frame 802 to divide the corresponding times into slots and associate the slots to a particular operation (e.g., reception, transmission, multicast operation, etc.). For example, as shown, parent node 32 and one of its child nodes may be synchronized to use the same channel during a given time slot.

Slot frame 802 may be characterized by a slotframe_ID, a slot duration, and a slotframe_size. In some implementations, multiple slot frames may coexist in a node's schedule. In other words, a node can have multiple activities scheduled in different slot frames, based on the priority of its packets/traffic flows. The different slot frames may be implemented as having the same durations/sizes or different durations/sizes, in various cases. The time slots in the slot frame may also be indexed by the slot offsets 604 (e.g., the first time slot in slot frame 802 may be indexed as slot offset 0, etc.).

In various implementations, different parent nodes may appropriate different chunks such that the chunks used throughout the network do not interfere. For example, chunks may be appropriated by different parent nodes such that, for a given chunk, the domains do not intersect. In addition, the domains for different chunks are generally not congruent since the chunks are owned by different nodes. As a result, the schedule in a node with a single radio is a series of transmissions, and the parent to child cells are taken from (one of) the chunk(s) that the parent has appropriated.

6TiSCH also defines the peer-wise concept of a "bundle," that is needed for the communication between adjacent nodes. In general, a bundle is a group of equivalent scheduled cells (e.g., cells identified by different slot offset/channel offset pairs), which are scheduled for a same purpose, with the same neighbor, with the same flags, and the same slot frame. The size of the bundle refers to the number of cells it includes. Given the length of the slot frame, the size of the bundle also translates directly into bandwidth, either logical or physical. Ultimately a bundle represents a half-duplex link between nodes, one transmitter and one or more receivers, with a bandwidth that amount to the sum of the time slots in the bundle. Adding a timeslot in a bundle increases the bandwidth of the link.

Track forwarding is the simplest and fastest forwarding model defined in the 6TiSCH architecture that specifies IPv6 over TSCH. In general, a "track" is defined as an end-to-end succession of time slots, with a particular timeslot belonging to at most one track. In this model, a set of input cells (time slots) are uniquely bound to a set of output cells, representing a forwarding state that can be used regardless of the upper layer protocol. In other words, a 6TiSCH track may represent a given path in a network, with the successive cells/time slots of the track representing the send and receive times of the nodes along the path. This model can effectively be seen as a G-MPLS operation in that the information used to switch is not an explicit label, but rather related to other properties of the way the packet was received, a particular cell in the case of 6TiSCH. As a result, as long as the TSCH MAC (and Layer 2 security) accepts a frame, that frame can be switched regardless of the protocol, whether this is an IPv6 packet, a 6LoWPAN fragment, or a frame from an alternate protocol such as WirelessHART of ISA100.11a.

For a given iteration of a slotframe, the timeslot is associated uniquely with a cell, which indicates the channel at which the timeslot operates for that iteration. A data frame that is forwarded along a track has a destination MAC address set to broadcast or a multicast address depending on MAC support. This way, the MAC layer in the intermediate nodes accepts the incoming frame and the 6top sublayer switches it without incurring a change in the MAC header. In the case of IEEE802.15.4e, this means effectively broadcast, so that along the track the short address for the destination is set to broadcast, 0xFFFF. Conversely, a frame that is received along a track with a destination MAC address set to this node is extracted from the track stream and delivered to the upper layer. A frame with an unrecognized MAC address may be ignored at the MAC layer and thus is not received at the 6top sublayer.

As noted above, TSCH-based mechanisms, such as 6TiSCH, allow for the scheduling of single-hop communications between nodes in a network. In particular, such mechanisms may assign a timeslot to a link between two nodes. During the timeslot, the first node may send a packet to the second node and, in turn, the second node may acknowledge the packet. While such scheduling mechanisms work well from a single-hop perspective (i.e., over a single link), they do not take into account the full propagation of the packet through the network.

Per-Packet, Time Slotted Channel Hopping (TSCH), Meta-Timeslot

The techniques herein introduce the concept of a macrocell that enables a communication network to schedule the transmission of a packet across the network, as opposed to a single attempt to send over a single link. Such a macrocell may be sized and scheduled as desired, thereby allowing for the use of global parameter settings (e.g., a global bandwidth for n-number of nodes/devices, etc.). In some aspects, a token-passing mechanism is also introduced herein, allowing the nodes/devices associated with a given macrocell to determine which node/device is authorized to transmit (e.g., the current relay node).

Specifically, according to various embodiments herein, a device in a network receives a time-slotted channel hopping (TSCH) communication schedule. The TSCH communication schedule is divided into a plurality of macrocells, each macrocell comprising a plurality of TSCH cells. The device receives a packet from a routing protocol child node of the device during a particular macrocell of the TSCH communication schedule that is associated with propagation of the packet through the network. In response to receiving the packet, the device claims a token associated with the particular macrocell that authorizes the device to transmit during one or more cells of the macrocell. The device transmits the received packet to a second node in the network during the authorized one or more cells of the particular macrocell. Typically, an ARQ process at Layer 2 with an acknowledgment indicating a successful transmission can be used to pass the token from the first node to the second node.

Illustratively, the techniques described herein may be performed by hardware, software, and/or firmware, such as in accordance with the communication schedule process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, as mentioned, TSCH-based techniques generally associate a time and frequency/channel with a given link between two network nodes. In 6TiSCH and the like, such an association is referred to as a "cell" and implements an IPv6 link as a collection of cells referred to as a "bundle." In various embodiments, the techniques herein further introduce the concept of a "macrocell" that is a collection of cells associated with the propagation of a single packet across the entire mesh/network. The size of the macrocell may determine the maximum number of attempts to relay the packet across the network. Time slot scheduling also applies to the macrocell, allowing for the scheduling of the propagation of the packet across the network. In other words, the macrocell may function as a meta-timeslot for the packet being transmitted.

Figure 9:
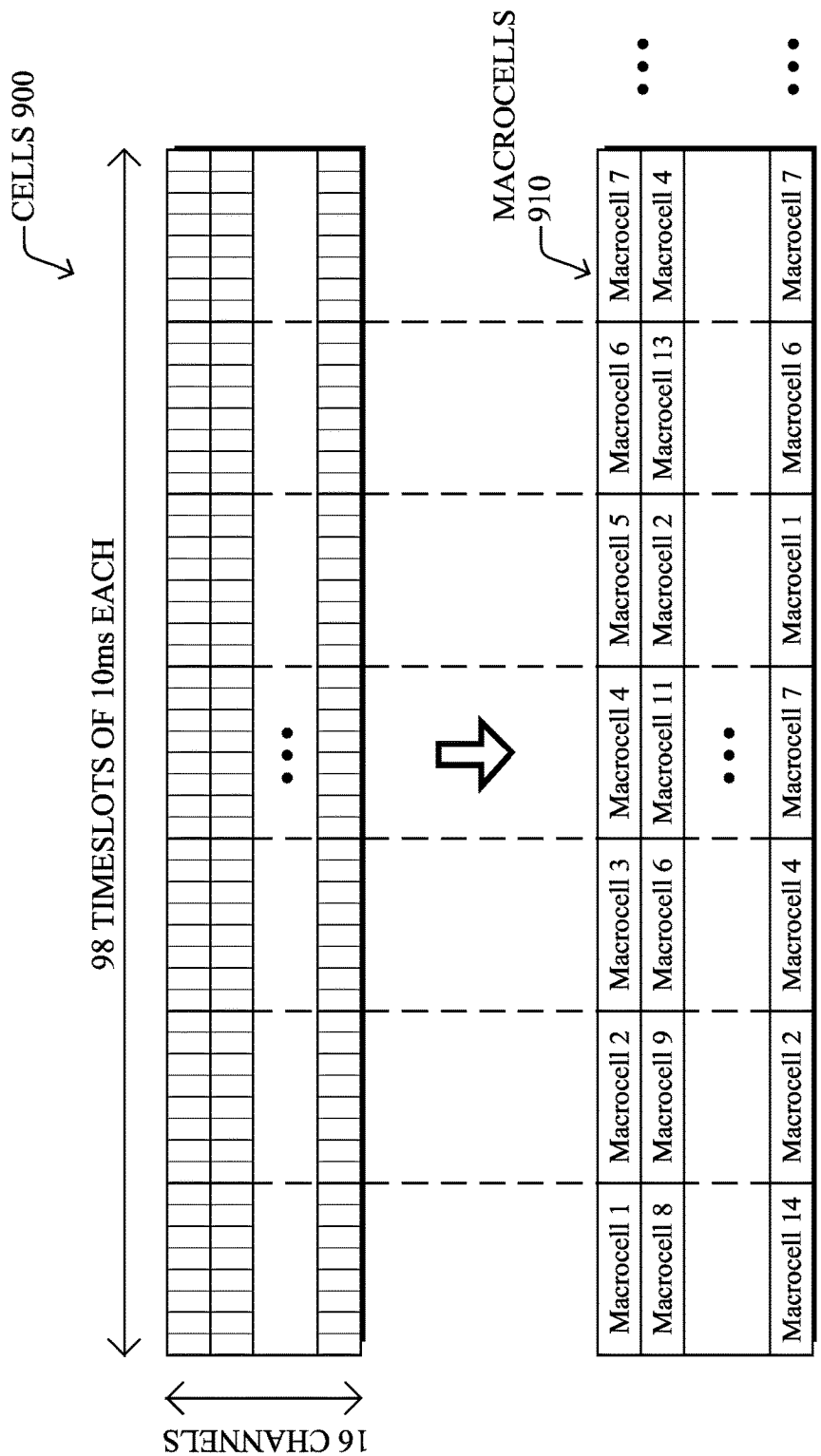
FIG. 9 illustrates an example of the assignment of CDU matrix cells to macrocells.

Referring now to FIG. 9, an example is shown of the assignment of 6TiSCH CDU matrix cells 900 to a set of macrocells 910. For example, assume that cells 900 represent a total of 98 timeslots of 10 milliseconds each across 16 channels/frequencies. In various embodiments, cells 900 may be grouped and assigned to macrocells 910. For example, cells 900 may be divided into a total of fourteen different macrocells 910, with each macrocell including seven cells 900. Various factors that may affect the formation of macrocells 910 may include, but are not limited to, the nodes/devices in the network (e.g., to assign each node/device to a particular macrocell, etc.), the number of retransmissions permitted for a given packet being conveyed across the network, a desired bandwidth for a set of nodes/devices in the network, or the like. In further embodiments, the cells in a given macrocell may not be consecutive, as in the case shown in FIG. 9, but may instead be interleaved.

Figure 10:
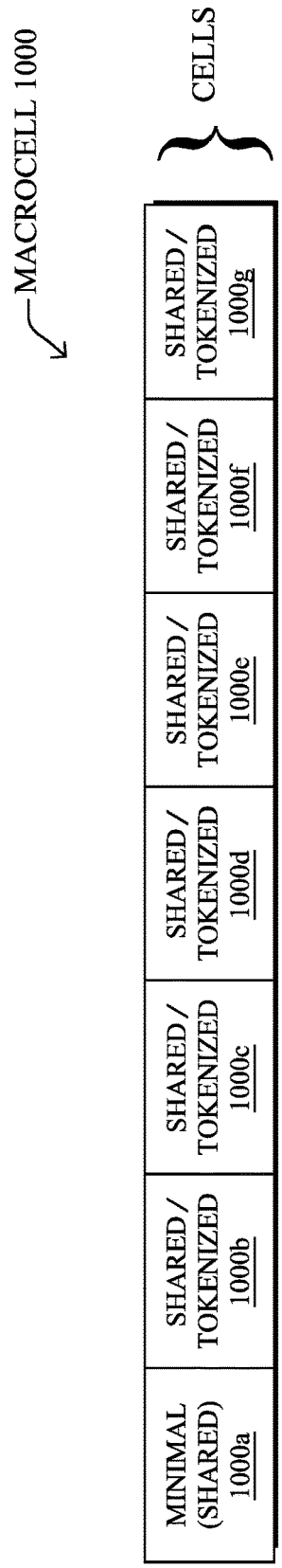
FIG. 10 illustrates an example macrocell of a communication schedule.

FIG. 10 illustrates an example macrocell 1000 of a communication schedule, according to various embodiments. Continuing the example of FIG. 9, assume that the CDU matrix was subdivided such that macrocell 1000 includes a total of seven cells/timeslots 1000a-1000g and that macrocell 1000 is associated with a particular sending node/device in the network.

In some embodiments, one or more of cells/timeslots 1000a-1000g may be designated as reserved for use by the routing protocol of the network. For example, in a 6TiSCH network that uses RPL, cell/timeslot 1000a may comprise the 6TiSCH Minimal. The remaining cells/timeslots 1000b-1000f may, in turn, be used to convey a specific packet across the network.

During use of macrocell 1000, cell/timeslot 1000a may be shared with all nodes/devices. Notably, cell/timeslot 1000a may not be associated with a particular node in the network, but instead may be used for routing protocol control (e.g., RPL control, etc.). In such a case, each leaf node in the DAG of the routing topology may listen during cell/timeslot 1000a, but not transmit.

FIGS. 11A-11E illustrate an example of network devices using macrocell 1000 to forward a packet in the network, according to various embodiments. As noted, the nodes/devices in the network may use cell/timeslot 1000a for routing protocol control, while the remaining cells/timeslots 1000b-1000f may be used to convey a particular packet from a particular sending node/device.

A maximum retry per hop may also be set for macrocell 1000. For example, the nodes/devices using macrocell 1000 may attempt up to a maximum of three retries at each hop.

The maximum Nb of transmission to reach the root is also fixed by the size of macrocell 1000, which is six, in the case shown.

In various embodiments, the nodes/devices using macrocell 1000 may employ a token-passing mechanism, to control which node/device along the path of the packet is authorized to transmit. In other words, ownership of the token controls which one of the devices along the path is able to transmit within macrocell 1000.

As shown in FIG. 11A, the original source of the packet has ownership of the token at time $T_0+1$ (e.g., during cell/timeslot 1000b). In other words, the initial ownership of the token may rest with the specific node/device associated with macrocell 1000 from which packets sent using macrocell 1000 originate. For example, during cell/timeslot 1000b, the source node/device A may send the packet to its routing protocol parent node/device, Parent1. If Parent1 successfully receives the packet, it may send an acknowledgement back to node A, to acknowledge receipt.

For purposes of example only, assume that Parent1 does not receive the packet sent by node A during cell/timeslot 1000b, for whatever reason (e.g., interference, etc.). In such a case, as shown in FIG. 11B, ownership of the token may stay with node A at time $T=T_0+2$, which coincides with cell/timeslot 1000c. In turn, node A may attempt to retransmit the packet to its routing protocol parent, Parent1 during cell/timeslot 1000c.

If the routing protocol parent of node A, Parent1, receives the retransmitted packet from node A during cell/timeslot 1000c, Parent1 may claim the token for macrocell 1000. For example, Parent1 may acknowledge receipt of the packet to node A, to indicate that node A can stop transmitting the packet during macrocell 1000. Such a token mechanism now authorizes Parent1 to transmit during the subsequent cells/timeslots 1000d-1000f of macrocell 1000.

As shown in FIG. 11C, at time $T_0+3$, which coincides with cell/timeslot 1000d, Parent1 now has the token for macrocell 1000 and is authorized to transmit during cell/timeslot 1000d. Accordingly, Parent1 may send the packet that it received from its child node A to its own routing protocol parent, Parent2 during cell/timeslot 1000d. In turn, Parent2 may acknowledge receipt of the packet and claim the token for macrocell 1000, authorizing it to transmit during the subsequent cells/timeslots.

In FIG. 11D, at time $T_0+4$, which coincides with cell/timeslot 1000e, Parent2 has both the token for macrocell 1000 and the packet received from its routing protocol child, Parent1. In such a case, Parent2 may transmit the packet to its own routing protocol parent, the Root node of the network. In turn, the Root node will claim the token for macrocell 1000 and acknowledge receipt of the packet to Parent2. The Root node can then use the remaining cells/timeslots 1000f-1000g for downward forwarding of the packet in the network.

In FIG. 11E, at time $T_0+5$, which coincides with cell/timeslot 1000f, the Root node may transmit the packet down to node X, which is the final destination of the packet. In some embodiments, if there are still remaining cells/timeslots in macrocell 1000, the endpoint destination, node X, may claim the token and use the remaining cells/timeslots to send back something.

By way of analogy, consider a bicycle road race in which the participant bikes are mesh leaves (e.g., clients/nodes) in the network and 6TiSCH is used to dedicate bandwidth per bike/node. Motorcycles, which may be part of the race organization, may act as relay devices. With such a mechanism in place, live race data can be captured over a very large distance and through a range of geographies (e.g., mountains, forests, cities, etc.). For example, each participant bicycle may send data (e.g., GPS location, speed, etc.) every second. A particular bicycle may, for instance, send such data to a relay motorcycle using an assigned macrocell. In turn, the motorcycle may claim the token for the macrocell and forward the packet on to its own parent in the network. This process may continue until the data arrives at its destination.

Figure 12:
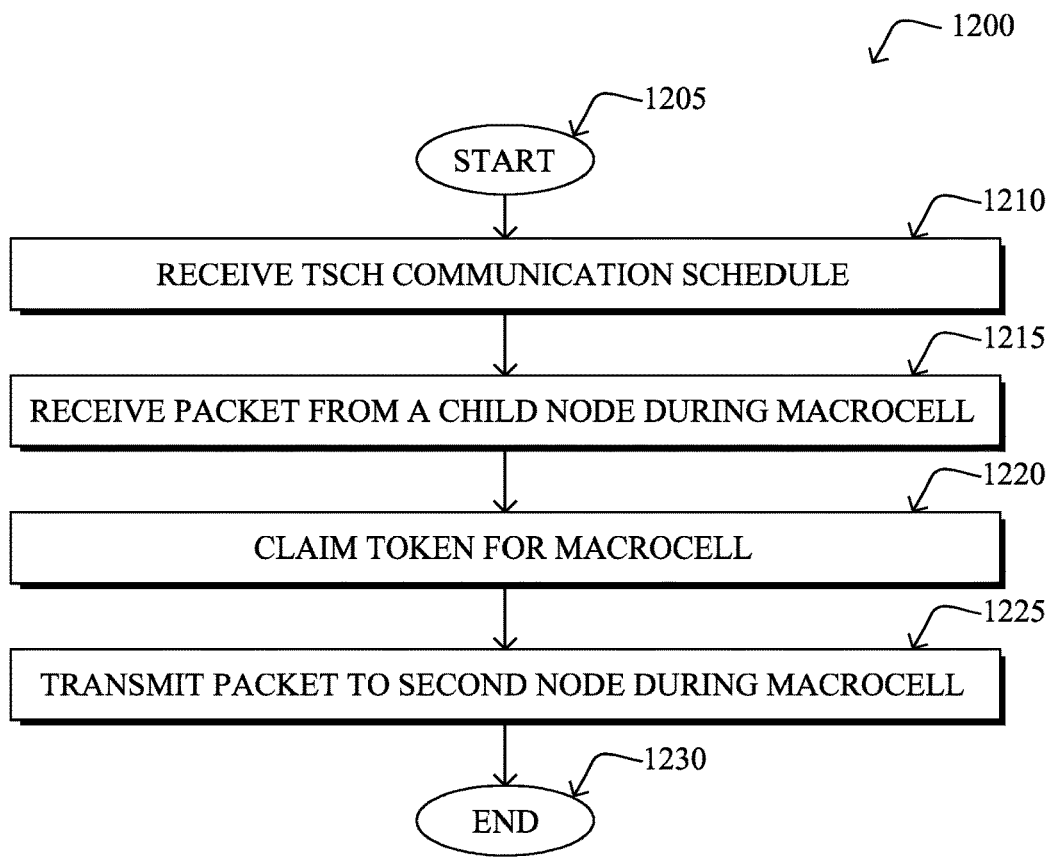
FIG. 12 illustrates an example simplified procedure for using a macrocell to forward a packet in a network.

FIG. 12 illustrates an example simplified procedure for using a macrocell to forward a packet in a network, in accordance with one or more embodiments described herein. In general, any non-generic, specifically configured device in the network may perform procedure 1200 (e.g., by executing process 248). Procedure 1200 starts at step 1205 and continues on to step 1210 where, as described in detail above, the device may receive a TSCH-based communication schedule. For example, the device may receive a 6TiSCH communication schedule. In various embodiments, the received schedule is divided into a plurality of macrocells. In turn, each macrocell may comprise a plurality of cells that represent specific timeslots and channels/frequencies.

At step 1215, as detailed above, the device may receive a packet during a particular macrocell of the communication schedule. For example, the device may remain in a listen mode during the various cells of the macrocell until it receives a packet from its child node, according to the routing topology (e.g., an RPL-created DAG, etc.).

At step 1220, the device may claim a token for the macrocell, in response to receiving the packet in step 1215, as described in greater detail above. In some embodiments, the device may claim the token by explicitly acknowledging receipt of the packet to the sender of the packet (e.g., the child of the device in the routing topology). Generally, the token may authorize the device to transmit during one or more cells of the particular macrocell. For example, in response to claiming ownership of the token, the device may now transmit during any of the cells of the macrocell that are subsequent to the cell in which the device received the packet (e.g., the remaining cells of the macrocell).

At step 1225, as detailed above, the device may transmit the packet to a second node in the network during the authorized one or more cells of the macrocell. For example, the device may attempt to transmit the packet to its routing protocol parent or, if the device is the root itself, to another child node of the device. If the transmission is not acknowledged by the second node, the device may attempt to resend the packet in subsequent cells of the macrocell, if available. Otherwise, if the second node acknowledged the receipt, the device may then switch back to a listening mode during any remaining cells of the macrocell. Procedure 1200 then ends at step 1230.

It should be noted that while certain steps within procedure 1200 may be optional as described above, the steps shown in FIG. 12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the use of macrocells as part of a TSCH-based communication schedule, such as a 6TiSCH schedule. Such macrocells allow for the scheduling of a global bandwidth for n-number of devices over multiple hops, to convey packets from a particular sender across the network using a particular one of the macrocells.

While there have been shown and described illustrative embodiments that provide for the use of macrocells as part of a communication schedule, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of shared-media networks and/or protocols (e.g., wireless). In addition, while certain protocols are shown, such as RPL and 6TiSCH, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device in a network, a time-slotted channel hopping (TSCH) communication schedule, wherein the TSCH communication schedule is divided into a plurality of macrocells, each macrocell comprising a plurality of TSCH cells required to provide full propagation of a packet through the network;
   receiving, at the device, a packet from a routing protocol child node of the device during a particular macrocell of the TSCH communication schedule, wherein the particular macrocell is associated with propagation of the packet through the network;
   claiming, by the device, a token associated with the particular macrocell, in response to receiving the packet, wherein the token authorizes the device to transmit during one or more authorized cells of the particular macrocell; and
   transmitting, by the device, the received packet to a second node in the network during the one or more authorized cells of the particular macrocell, wherein the one or more authorized cells are non-consecutive cells of the TSCH communication schedule.

2. The method as in claim 1, wherein the TSCH communication schedule is an Internet Protocol version 6 (IPv6) over TSCH (6TiSCH) communication schedule.

3. The method as in claim 1, wherein a designated cell of the particular macrocell is reserved for communication of routing protocol messages, the method further comprising:
   listening, by the device, for the routing protocol messages during the designated cell of the particular macrocell.

4. The method as in claim 1, wherein each of the one or more authorized cells of the particular macrocell is associated with a communication channel and time slot.

5. The method as in claim 1, wherein claiming the token associated with the particular macrocell comprises:
   transmitting, by the device, an acknowledgement to the routing protocol child node, in response to receiving the packet from the routing protocol child node during the particular macrocell.

6. The method as in claim 1, further comprising:
   determining, by the device, whether the second node acknowledged the packet transmitted to the second node.

7. The method as in claim 6, further comprising:
   switching, by the device, to a listening mode during the particular macrocell, in response to determining that the second node acknowledged the packet transmitted to the second node.

8. The method as in claim 6, further comprising:
   retransmitting, by the device, the packet to the second node during a subsequent cell of the particular macrocell, in response to determining that the second node did not acknowledge the packet transmitted to the second node.

9. An apparatus, comprising:
   one or more network interfaces to communicate with a network;
   a processor coupled to the network interfaces and adapted to execute one or more processes; and
   a memory configured to store a process executable by the processor, the process when executed configured to:
      receive a time-slotted channel hopping (TSCH) communication schedule, wherein the TSCH communication schedule is divided into a plurality of macrocells, each macrocell comprising a plurality of TSCH cells;
      receive a packet from a routing protocol child node of the apparatus during a particular macrocell of the TSCH communication schedule, wherein the particular macrocell is associated with propagation of the packet through the network required to provide full propagation of a packet through the network;
      claim a token associated with the particular macrocell, in response to receiving the packet, wherein the token authorizes the apparatus to transmit during one or more authorized cells of the particular macrocell; and
      transmit the received packet to a second node in the network during the one or more authorized cells of the particular macrocell, wherein the one or more authorized cells are non-consecutive cells of the TSCH communication schedule.

10. The apparatus as in claim 9, wherein the TSCH communication schedule is an Internet Protocol version 6 (IPv6) over TSCH (6TiSCH) communication schedule.

11. The apparatus as in claim 9, wherein a designated cell of the particular macrocell is reserved for communication of routing protocol messages, and wherein the process when executed is further configured to:
    listen for the routing protocol messages during the designated cell of the particular macrocell.

12. The apparatus as in claim 9, wherein each of the one or more authorized cells of the particular macrocell is associated with a communication channel and time slot.

13. The apparatus as in claim 9, wherein the apparatus claims the token associated with the particular macrocell by transmitting an acknowledgement to the routing protocol child node, in response to receiving the packet from the routing protocol child node during the particular macrocell.

14. The apparatus as in claim 9, wherein the process when executed is further configured to:

determine whether the second node acknowledged the packet transmitted to the second node.

15. The apparatus as in claim 14, wherein the process when executed is further configured to:
switch to a listening mode during the particular macrocell, in response to determining that the second node acknowledged the packet transmitted to the second node.

16. The apparatus as in claim 14, wherein the process when executed is further configured to:
retransmit the packet to the second node during a subsequent cell of the particular macrocell, in response to determining that the second node did not acknowledge the packet transmitted to the second node.

17. The apparatus as in claim 9, wherein the routing protocol child node of the apparatus is a child node of the apparatus according to a directed acyclic graph (DAG)-based routing topology in the network established via a routing protocol.

18. A tangible, non-transitory, computer-readable media having software encoded thereon, the software when executed by a device in a network configured to:
receive, at the device, a time-slotted channel hopping (TSCH) communication schedule, wherein the TSCH communication schedule is divided into a plurality of macrocells, each macrocell comprising a plurality of TSCH cells required to provide full propagation of a packet through the network;
receive a packet from a routing protocol child node of the device during a particular macrocell of the TSCH communication schedule, wherein the particular macrocell is associated with propagation of the packet through the network;
claim a token associated with the particular macrocell, in response to receiving the packet, wherein the token authorizes the device to transmit during one or more authorized cells of the particular macrocell; and
transmit the received packet to a second node in the network during the one or more authorized cells of the particular macrocell, wherein the one or more authorized cells are non-consecutive cells of the TSCH communication schedule.

* * * * *